Patented July 19, 1932

1,867,943

UNITED STATES PATENT OFFICE

WALTER NORMAN HAWORTH, OF BIRMINGHAM, ENGLAND

METHOD OF CONCENTRATING AQUEOUS SOLUTIONS OF ACETIC OR FORMIC ACID

No Drawing. Application filed July 8, 1927, Serial No. 204,424, and in England October 19, 1926.

This invention relates to an improved method of concentrating aqueous solutions of water-miscible fatty acids, namely acetic or formic acid, especially solutions containing more than 50% water.

It is not practicable to effect satisfactory separation of acetic acid and water from each other, by fractional distillation either at ordinary or reduced pressure.

According to the present invention, I first distil a mixture of aqueous acetic acid and sodium acetate under reduced pressure (partial vacuum) so as to remove the greater part of the water and I then further distil the residue either under a still more reduced pressure or preferably at a higher temperature, but usually still under reduced pressure, to separate the acetic acid from the acid acetate. Formic acid may be similarly treated with a formate. I prefer to conduct the whole process in a single still.

Example 1

104 parts by weight of 30% acetic acid were mixed with 63 parts by weight of anhydrous sodium acetate. Water containing very little acid was distilled off at as low a temperature as practicable, under a vacuum of 15-25 mm. (absolute pressure). After distillation of the bulk of the water (in the form of a material containing very little acetic acid), the temperature was raised and the strong acetic acid was then distilled off. Over 80% of the original acetic acid was recovered (in this latter step) in the form of acid of 98.6% strength, while the aqueous distillate (of the earlier part of the process) also contained substantial quantities of a very weak acetic acid which however could be further concentrated, for example by repeating the original process. An attempted fractionation of the same mixture, both stages of the process being conducted at atmospheric pressure under otherwise similar conditions gave a yield of only about 32% of acetic acid at 86% strength.

Potassium acetate can be successfully used instead of the sodium salt, and it has the advantage that less salt is pulled over by the vacuum in the form of a fine dust, as compared with the sodium salt. A dust trap may be used to intercept this dust. Although some concentration can be effected by the use of calcium acetate or magnesium acetate, the results are not nearly so satisfactory.

It is not essential to use anhydrous sodium acetate as the crystallized salt can also be used, but obviously it is undesirable to dilute the acetic acid still further by water of crystallization and therefore I prefer to employ anhydrous acetate.

The process may be performed under different degrees of vacuum and in particular, although quite good results are obtained at 15-25 mm. a higher vacuum may also be employed.

The first stage of the process should be concluded under vacuum though heated air may be used initially in the distillation of a substantial fraction of the water. The second stage may be performed at atmospheric pressure but I prefer the use of vacuum.

The process may be applied to the concentration of acetic acid of practically any strength, since quite substantial concentration is obtained, even when the original liquid contains only say 6% of acetic acid.

It is desirable to provide means to break down lumps of solid within the still, e. g., by using a rotary still with scraping devices or a fixed still with agitating or grinding devices. Such comminution helps to remove occluded water during final drying in the first stage.

Example 2 (Formic acid)

Mix 100 parts by weight of 30% formic acid with 120 parts by weight of anhydrous sodium formate. Distil off the bulk of the water at 10-20 mm. Hg at about 50-55° C. and then distil off the strong formic acid at 10-20 mm. Hg pressure at about 130°-140° C. using a receiver cooled to −10° C. A recovery of over 80% of the acid is obtained as a distillate of 98% strength.

The invention includes any process in which the acetate is employed in such manner that water first distils off (at least the latter part of this operation being conducted in a partial vacuum), leaving the acid associated with the salt, while later the acid is distilled off from the salt, except the process which has already been proposed, wherein an acid potassium acetate is separated by crystallization from an aqueous mother liquor and acetic acid is obtained by distillation of the acid salt. My process has the valuable feature that no separation of acid salt from solution is contemplated or effected and the whole process of sharp separation of acetic acid and water can be effected in a single vessel in what is practically a single operation having two consecutive phases, firstly of removal of water, the first part of this stage may be under vacuum or at atmospheric pressure, and the latter part being under vacuum, and secondly of removal of acetic acid, this stage being performed at a substantially higher temperature than the first stage.

Atmospheric pressure is several hundred millimeters of mercury, but the absolute pressures used in the present process are not over a few tens of millimeters. The pressures given in the examples (millimeters of mercury) refer throughout to absolute pressure.

I claim as my invention:—

1. The process of concentrating a mixture containing water and a fatty acid miscible with water and containing a soluble salt of said acid, which comprises removing water by distillation therefrom while under an absolute pressure not greater than a few tens of millimeters and then removing concentrated acid by further distillation.

2. The process of concentrating aqueous acetic acid containing a soluble acetate which comprises removing water by distillation while under an absolute pressure not greater than only a few tens of millimeters and continuing this operation until practically all water is removed, and then removing concentrated acid by further distillation.

3. The process as in claim 1 in which both stages of distillation are performed under an absolute pressure of only a few tens of millimeters.

4. The process as in claim 2 in which the further distillation is performed under an absolute pressure of only a few tens of millimeters.

5. The process of concentrating an aqueous water-miscible fatty acid which comprises adding an alkali-metal salt of said acid, distilling a minor portion of the water from the mixture, then distilling substantially all remaining water under an absolute pressure of only a few tens of millimeters and then heating the dry acid and salt composition sufficiently to distill off the fatty acid in a concentrated state.

6. In the process of concentrating an aqueous water-miscible fatty acid in admixture with a soluble salt of that acid by fractionally distilling the mixture to collect first a fraction which is more dilute and then a fraction which is more concentrated as regards said acid, the herein described improvement in which at least the final part of the first distillation is conducted under an absolute pressure not greater than a few tens of millimeters.

7. A process of separating a water-miscible fatty acid from an aqueous solution thereof also containing a salt of said acid, which comprises distilling off, from said mixture substantially all of its water content, with a minor fraction only of said acid, at least the last half of this water fraction being distilled at an absolute pressure not greatly exceeding 25 mm. and thereafter distilling the major part of the residue of said acid from the mixture, in a highly concentrated state.

8. A process of separating a water-miscible fatty acid from an aqueous solution thereof also containing a salt of said acid, which comprises distilling off, from said mixture substantially all of its water content, with a minor fraction only of said acid, at least the last half of this watery fraction being distilled at an absolute pressure not greatly exceeding 25 mm. and thereafter distilling the major part of the residue of said acid from the mixture, at a higher temperature, in a highly concentrated state.

9. A process of separating a water-miscible fatty acid from an aqueous solution thereof also containing a salt of said acid, which comprises distilling off, from said mixture substantially all of its water content, with a minor fraction only of said acid, at least the last half of this watery fraction being distilled at an absolute pressure not greatly exceeding 25 mm. and thereafter distilling the major part of the residue of said acid from the mixture, under a still lower pressure, in a highly concentrated state.

10. Process as in claim 7, in which a minor part of the water present in the mixture is distilled, at the beginning of the process, at about atmospheric pressure.

In witness whereof, I have hereunto signed my name this 21st day of June, 1927.

WALTER NORMAN HAWORTH.